Figure 1:
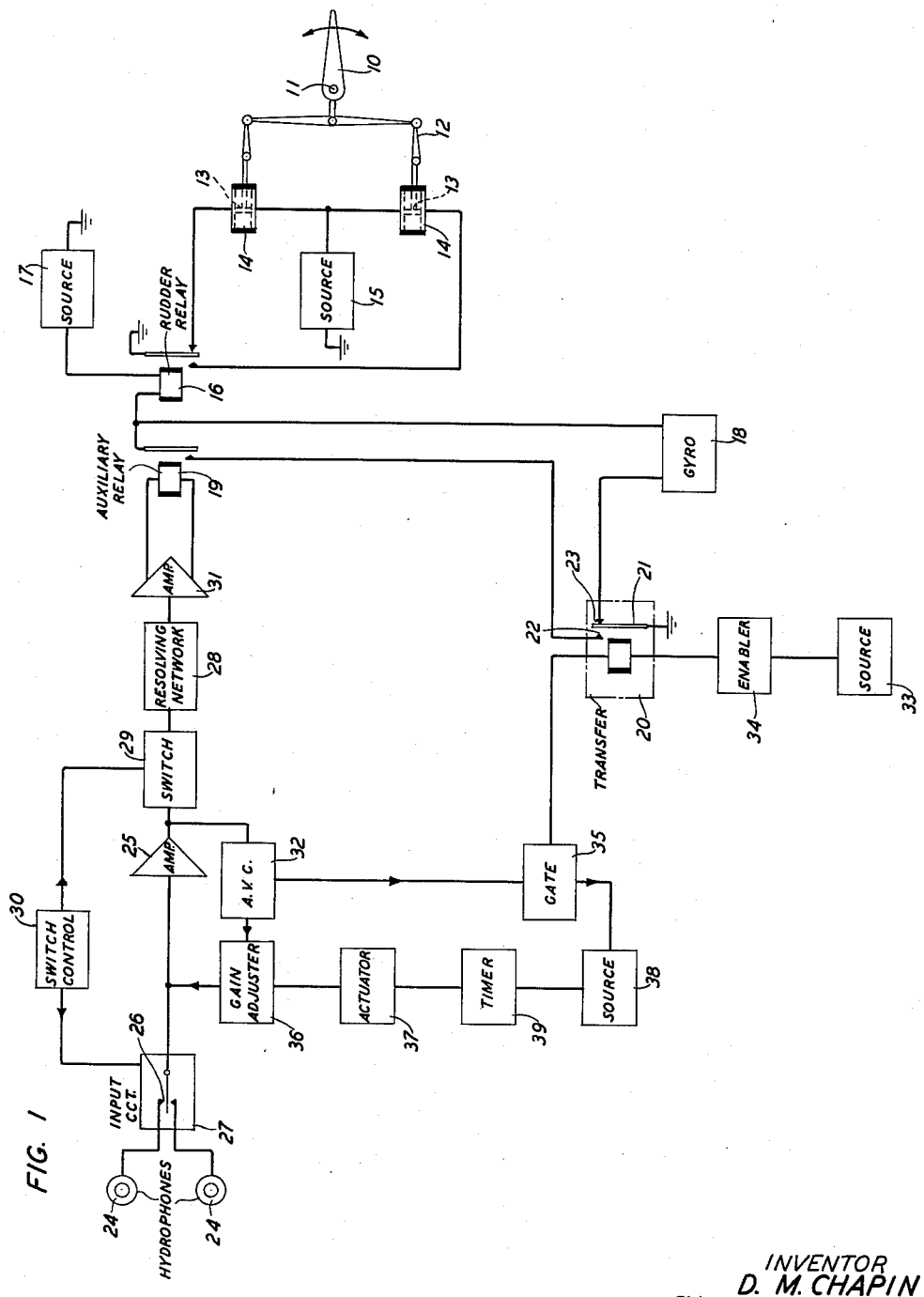

July 11, 1961 D. M. CHAPIN 2,991,741
TORPEDO CONTROL CIRCUIT
Filed Sept. 23, 1944 2 Sheets-Sheet 1

INVENTOR
D. M. CHAPIN
BY
Walter C. Kiesel
ATTORNEY

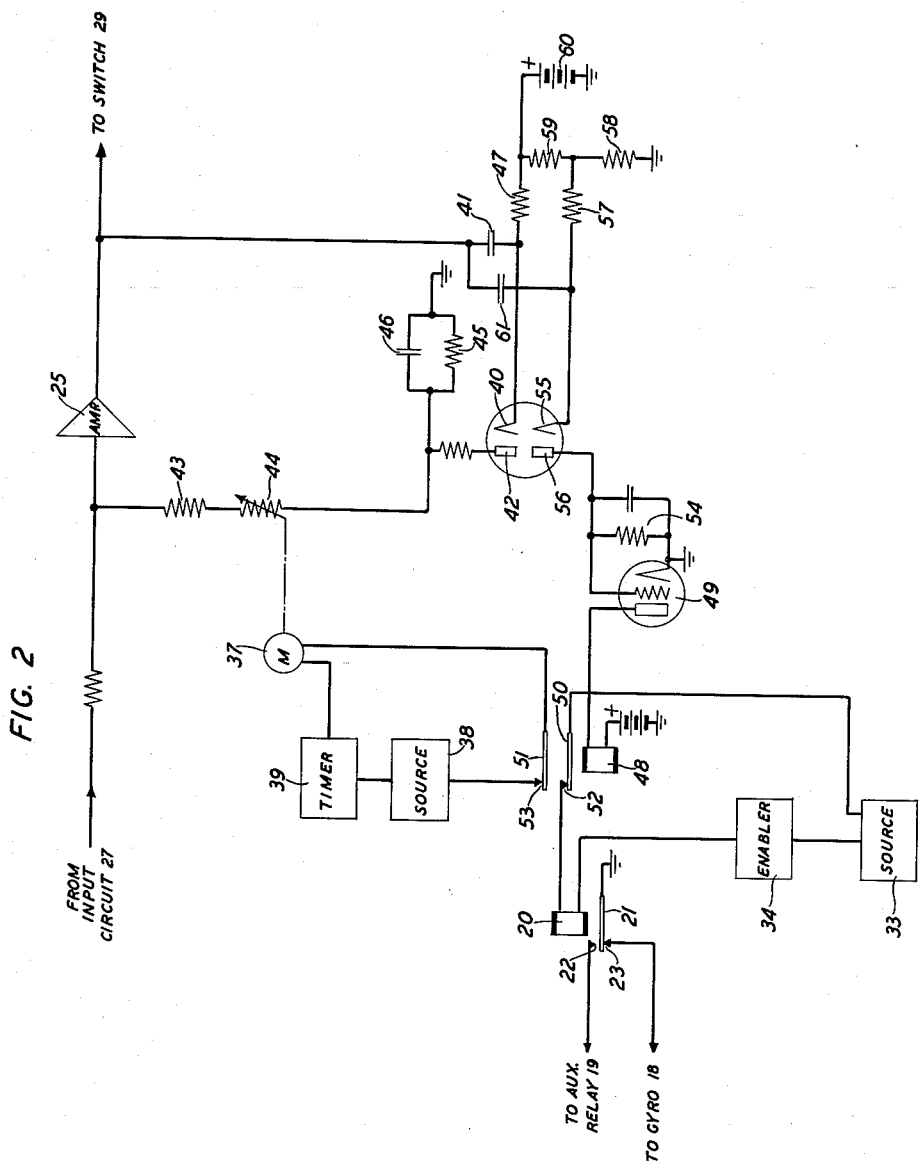

United States Patent Office 2,991,741
Patented July 11, 1961

2,991,741
TORPEDO CONTROL CIRCUIT
Daryl M. Chapin, Basking Ridge, N.J., assignor to Bell Telephone Laboratories, Incorporated, New York, N.Y., a corporation of New York
Filed Sept. 23, 1944, Ser. No. 555,522
11 Claims. (Cl. 114—23)

This invention relates to control circuits and more particularly to torpedo steering systems of the type, such as disclosed in the application, Serial No. 555,523 filed September 23, 1944 of John C. Steinberg, wherein the rudder is adapted to be controlled by either a gyroscope or a submarine signal responsive system.

Briefly, in systems of this type, the rudder is under control of a gyroscope for the first portion of the torpedo run so that the torpedo is maintained upon a preset course, and subsequently is transferred to control by the signal responsive system which serves to guide the torpedo to the target in accordance with submarine signals, e.g. propeller and ship noises, emanating therefrom. The transfer of the rudder from gyroscope to signal control may be effected by a gate element which is set to operate only when the submarine signal level in the vicinity of the torpedo is of at least a preassigned amplitude.

The level of target signals at any region within the signal field is dependent, of course, upon distance from the target. Thus, the level for which the gate element is set to operate determines the distance between the target and the torpedo at which the rudder is transferred from gyroscope to signal control. Generally, it is desirable that this distance be as great as possible. A torpedo, when in operation, is itself a source of submarine signals, for example noise due to the propelling mechanism and elements of the steering equipment and to the motion of the torpedo through the water. Such signals may be termed torpedo self-noise. The level of self-noise varies among different torpedoes, due to, among other factors, manufacturing tolerances and variations in component parts. Also, this level may vary appreciably for any particular torpedo throughout its run inasmuch as it is dependent upon the torpedo depth and its speed, among other factors.

Such self-noise places a limitation upon the minimum level of submarine signals in the vicinity of the torpedo for which the gate element may be set to operate. Obviously, the level requisite for operation of the gate element must be sufficiently high to prevent such operation by self-noise alone, in order to prevent false transfer of the rudder from gyroscope to signal control and consequent steering of the torpedo in accordance with its own self-noise. That is to say, if the gate element were to operate upon self-noise, the torpedo would be steered in accordance with such noise and might never reach a point at which the target signals would become effective. Inasmuch as, as pointed out above, the self-noise varies among torpedoes and also for a single torpedo, it has been necessary to set the level for operation of the gate element sufficiently high to allow for the most undesirable conditions that may be encountered, that is, for the maximum self-noise that may be expected or, stated in another way, for the noisiest torpedo operating under such conditions of depth, speed and other factors that the self-noise level was the maximum likely to be encountered. As a result, a limitation is placed upon the signal control range of the torpedo, that is, the distance from the target at which the rudder will be transferred to control in accordance with target signals and, as is apparent, torpedoes and especially those of lower self-noise suffer an unnecessary reduction in signal control range.

One object of this invention is to increase the signal control range of torpedoes having signal responsive steering systems.

More specifically, one object of this invention is to effect transfer of control of the rudder from gyroscope to signal control in a torpedo of the type above described at the greatest distance from the target at which the total submarine signal level, that is, considering both target signals and self-noise, is substantially a minimum above the self-noise level consistent with the ratio of target signal to self-noise for which the signal control is effective to steer the torpedo in accordance with target signals.

In accordance with one feature of this invention, in a system of the type above described, means are provided for automatically adjusting the energizing circuit for the gate element during a prescribed period while the rudder is under gyroscope control so that the total submarine signal level requisite for operation of the gate element is substantially a minimum above the self-noise level.

In accordance with a more specific feature of this invention, in such a system wherein the gate element is a relay controlled in accordance with the output of an electronic amplifier energized proportionately to the total submarine signal level in the vicinity of the torpedo, means are provided for automatically adjusting the gain of the amplifier so that the self-noise will be insufficient to cause operation of the gate relay.

The invention and the above-noted and other features thereof will be understood more clearly and fully from the following detailed description with reference to the accompanying drawing in which:

FIG. 1 is a diagram, mainly in functional schematic form, of a torpedo steering system illustrative of one embodiment of this invention; and FIG. 2 is a circuit diagram showing details of a gate sensitivity adjusting system constructed in accordance with this invention.

Referring now to the drawing, the steering system illustrated in FIG. 1 comprises a rudder 10 for steering the torpedo horizontally, the rudder being pivoted as indicated at 11 and deflectable in opposite directions by an actuating mechanism including a linkage 12 and the armatures 13 of similar solenoids 14. The direction of deflection of the rudder is determined by which of the solenoids 14 is energized, the energizing circuit for each of the solenoids including the source 15 and the armature and respective contact of the rudder relay 16. The relay 16 is arranged to be energized from a source 17 and to be controlled by either a gyroscope element 18 or a signal controlled auxiliary relay 19, dependent upon the condition of a transfer relay 20 which has an armature 21 and transfer contacts 22 and 23.

Normally the transfer relay 20 is deenergized and its armature is in engagement with the contact 23 so that the energizing circuit for the rudder relay 16 is traced from ground, through the source 17, the relay winding and gyroscope element 18, over contact 23 to the armature 21 and thence to ground. The gyroscope element is of generally known construction and, therefore, need not be described in detail here. Suffice it to say that it functions to open and close the energizing circuit for the relay 16 depending upon the direction of deviation of the torpedo from a preset course, whereby the solenoids 14 are energized accordingly to maintain the torpedo on course.

When the transfer relay 20 is energized, as described hereinafter, the energizing circuit for the rudder relay 16 is broken at the contact 23 and is placed under control of the auxiliary relay 19 over an obvious circuit by way of the contact 22.

The auxiliary relay 19 is controlled by a submarine signal responsive system, which may be of the general construction disclosed in the application, Serial No. 491,795, filed June 22, 1943 of Donald D. Robertson, comprising a pair of similar hydrophones 24 mounted on opposite sides of the longitudinal axis of the torpedo so that the relative outputs thereof are related to the bearing of the source of the signals received thereby, with respect to the axis noted. The hydrophones 24 are connected in alternation to the input side of an amplifier 25 by a switch 26 included in an input circuit 27 and the amplifier output is supplied to a resolving network 28 by way of a switch 29 which is operated in synchronism with the switch 26 by a switch control 30. As described fully in the above-identified application of Donald D. Robertson, the resolving network functions to convert the hydrophone signals into a direct current signal of polarity and amplitude determined by the relative outputs of the two hydrophones and, hence, to the direction and bearing of the source of the signals received by the hydrophones, with respect to the torpedo. The direct current signal produced by the resolving network is impressed upon the input circuit of a direct current amplifier 31 which is biased at cut-off. The relay 16 is included in the output circuit of the amplifier 31 and, thus, is controlled in accordance with the direction of the signals received by the hydrophones.

The amplifier 25 is provided with automatic volume control 32 so that the outputs of the hydrophones 24 are resolved on a relative rather than an absolute intensity basis and the direct current signal obtained from the resolving network 28 is proportional to the relative intensities of the outputs of the hydrophones and substantially independent of the absolute signal lever at the hydrophones. The control voltage produced by the volume control 32, of course, is proportional to the absolute signal level at the hydrophones. This voltage is impressed upon a control electrode of the amplifier 25 by way of a gain adjusting element 36 which will be described in detail hereinafter.

The transfer relay 20 is adapted to be energized by a source 33, the energizing circuit being under control of an enabler 34 and a gate element 35, the latter being controlled in turn in accordance with the automatic volume control voltage. As noted heretofore, normally the relay 20 is deenergized. The enabler 34 is set to operate at a preassigned time after the torpedo has been launched, specifically a time sufficient to allow the torpedo to travel to a point beyond the effective signal field of the launching vessel, e.g. submarine. The gate element 35 is set to operate only when the automatic volume control voltage is of at least a preassigned magnitude so that, inasmuch as this voltage is determined by the signal level at the hydrophones, the gate element can operate only when this level is of at least a preassigned magnitude. As pointed out hereinafter, the gate control is such, in systems constructed in accordance with this invention, that the gate element will respond only when the total signal level at the hydrophones is greater, to a prescribed extent, than the self-noise level. Operation of both the enabler 34 and gate element 35 is requisite for operation of the transfer relay 20.

The general operation of the steering system as thus far described and assuming the gain adjustment 36 as set to provide a preassigned gain for the amplifier is as follows: When the torpedo is launched, it proceeds upon a preset course with the rudder 10 under control of the gyroscope element 18. After the torpedo has traveled a prescribed distance, sufficient to place it beyond the effective signal field of the launching vessel, the enabler 34 operates. Unless at this time the signal level at the hydrophones is above that requisite to result in operation of the gate element 35, the rudder remains under gyroscope control; when the torpedo subsequently reaches such position that the target signals at the hydrophones in conjunction with the self-noise are sufficient to effect operation of the gate element 35, the transfer relay 20 operates whereby the gyroscope element 18 is effectively disassociated from the rudder relay 16 and the latter and, hence, the rudder, are placed under control of the signal responsive system. The torpedo thenceforth is guided to the target in accordance with signals emanating from the target.

The automatic volume control voltage is proportional to the output of the amplifier 25 and, therefore, is dependent upon the gain of this amplifier and the signal level at the hydrophones. Hence, if the gain is fixed, the operating point of the gate element 35 is determined by the signal level at the hydrophones. Thus, as has been pointed out heretofore, in order to prevent false operation of the gate element by torpedo self-noise, if the initial gain of the amplifier is fixed it must be set at a value to allow for the most undesirable conditions of self-noise which may be expected to be encountered and this involves, inherently, a decrease in the signal control range of the torpedo.

In accordance with one feature of this invention, means are provided for automatically adjusting the gain of the amplifier 25 while the rudder is under gyroscope control, proportionately to the self-noise so that by the time the enabler 34 is operated the gate system is conditioned to effect operation of the gate element at the lowest signal level at the hydrophones, consistent with the self-noise. That is to say, the gate system is adjusted so that the automatic volume control voltage requisite to effect operation of the gate element is obtained for a signal level at the hydrophones just above the level of the self-noise. Specifically, as illustrated in FIG. 1, the gain adjuster 36 is adapted to be operated by an actuator 37 energized from a source 38 under control of a timer 39 and the gate element 35. Normally, the energizing circuit for the actuator 37 is open; it is closed only when both the timer and the gate element have operated. The timer 39 is set to close only after the torpedo, subsequent to launching thereof, has traveled to a point beyond the effective signal field of the launching vessel and to open at or slightly before the time that the enabler 34 operates. The gain adjustment 36 is set initially so that the gain of the amplifier is fairly high and is associated with the actuator 37 that operation of the latter reduces the gain.

The operation and effect of the gain adjustment will be understood from the following considerations: Throughout the latter portion of the period when the rudder 10 is under control of the gyroscope element 18, during which the timer 39 is operated, the signals received by the hydrophones consist essentially of self-noise signals. Inasmuch as, as noted above, the initial gain of the amplifier 25 is high, such signals result in operation of the gate element 35 and consequent closing of the energizing circuit for the actuator 36. The latter operates, therefore, as long as the gate element remains operated during the period noted and results in reduction of the amplifier gain. As the amplifier gain decreases, the automatic volume control voltage also decreases and to such value that it is insufficient to maintain the gate element operated. When this value is reached, the gate element opens the energizing circuit for the actuator. Thus, by the time the enabler 34 operates, the gain of the amplifier 25 has been adjusted to such value that self-noise is insufficient to result in operation of the gate element to effect transfer of the rudder from gyroscope to signal control.

The improvement in signal control range realized by such adjustment of the amplifier gain will be appreciated from consideration of a specific example. Assume that in order to allow for the worst self-noise conditions, the gain is fixed so that the gate element 35 will operate only when the total signal at the hydrophones is 10 decibels above the self-noise, whereas for the particular torpedo adequate protection against false operation of the gate element would be realized if the total noise requisite for operation of the gate element were 2 decibels above the self-noise. The 10-decibel difference requires that the target signal be 9.5 decibels above the self-noise; the 2-decibel difference requires that the target signal be 2 decibels below self-noise. Thus, if the gain is adjusted to provide for the 2-decibel difference, the decrease in target signal level requisite to effect proper operation of the gate element is 11.5 decibels which represents an increase by a factor of about 3.7 in the signal control range of the torpedo.

Details of a gain adjustment system illustrative of this invention are shown in FIG. 2. The output side of the amplifier 25 is connected to the cathode 40 of a diode rectifier 41 by way of a suitable condenser 41. The anode 42 of this rectifier is connected to the input circuit of the amplifier 25, which circuit includes a fixed resistor 43, a variable resistor 44, and a resistance-condenser combination 45, 46. The cathode 40 is biased at a positive potential with respect to the anode 42 from a suitable source 60 by way of a resistor 47. The parameters of the elements involved are correlated so that the peak output voltages of the amplifier 25 are sufficient to overcome the positive bias on the cathode 40 and make the cathode potential negative with respect to the anode 42, whereby a negative bias is impressed upon the input or control electrode of the amplifier. The greater the amplifier output, the greater is the negative bias provided by the diode so that the gain of the amplifier is controlled accordingly. The gain, of course, will be dependent upon the magnitude of the resistors 43 and 44.

The gate element 35 comprises a relay 48 which is connected in the output circuit of an amplifier device 49 and is provided with a pair of armatures 50 and 51 and associated contacts 52 and 53 respectively. The armature 50 and associated contact 52 are included in the energizing circuit for the transfer relay 20; the armature 51 and associated contact 53 are included in the energizing circuit for the motor 37 which, when energized, varies the resistance 44. The input circuit for the amplifier device 49 includes the resistance-condenser combination 54, the diode rectifier element 55, 56 which advantageously is the same as rectifier element 40, 42, and suitable resistors 57 and 58, the common terminal of which is connected to the automatic volume control circuit by way of a resistor 59. The cathode 55 is coupled to the output side of the amplifier 25 by a suitable condenser 61. The normal potentials of the electrodes of the device 49 are such that this device is conductive and the relay 48 is energized, whereby the armatures 50 and 51 are disengaged from the respective contact and the energizing circuits for the transfer relay 20 and motor 37 are open. The resistor 44 is set initially so that the gain of the amplifier 25 is relatively high, sufficiently so that the peak voltage outputs of the amplifier for self-noise will drive the cathodes 40 and 55 negative with respect to the respective anodes 42 and 56.

When the torpedo is launched, as noted heretofore the device 49 is conductive and the relay 48 is energized. After the torpedo has traveled a distance sufficient to place it beyond the effective signal field of the launching vessel, the timer 39 operates so that the energizing circuit for the motor 37 is adapted for control by the gate relay 48 at the armature 51 and associated contact 53. At the time timer 39 operates, the signals at the hydrophones 24 consist substantially of self-noise. The output of the amplifier 25 for such self-noise, because of the initial relatively high gain of the amplifier, drives the cathode 55 negative with respect to the anode 56 whereby a negative potential is placed upon the input circuit of the device 49 and this device is rendered non-conducting or its output current is reduced to a value insufficient to maintain the relay 48 operated. Thus, this relay releases, the energizing circuit for the motor 37 is closed and the resistor 44 is varied to decrease the gain of the amplifier 25. While the timer remains operated, the motor 37 operates so long as the amplifier gain is sufficient to result in release of the gate relay 48. When resistor 44 has been varied to such value that the gain of the amplifier 25 is insufficient to result in the application of the requisite bias upon the input circuit of the device 49, the relay 48 is energized and the energizing circuit for the motor 37 is opened at the contact 53.

It is apparent that the signal level at the hydrophones 24 for which the relay 48 will be caused to operate by adjustment of the resistor 44 in the manner described above will be substantially the self-noise level. Thus, by variation of the resistor 44, and hence, of the gain of the amplifier 25, the gate relay circuit is set so that self-noise is insufficient to result in release of the gate relay 48. After the resistor 44 has been adjusted in accordance with the self-noise, the timer 39 operates to open permanently thereafter the energizing circuit for the motor 37, and the enabler 34 operates to permit operation of the transfer relay 20 by release of the gate relay 48. Thus, when the gain of the amplifier 25 has been adjusted as described above, the relay 48 can be caused to release only when the signal level at the hydrophones 24 is somewhat above the self-noise level and inasmuch as the gain adjustment is in accordance with the self-noise, the gate relay circuit is conditioned to effect transfer of the rudder from gyroscope to signal control for a signal level at the hydrophones at substantially a minimum above the self-noise. Consequently, the gate system is adjusted automatically to provide for the maximum signal control range of any particular torpedo consistent with the self-noise of the torpedo or, stated in another way, transfer of the rudder to signal control is effected at the maximum distance from the target at which the target signal level is just enough to effect release of the gate relay under the conditions of self-noise for that particular torpedo.

Advantageously, the timer 39 is so set and the rate of variation of the resistor 44 is made such that the gain adjustment of the amplifier 25 in accordance with self-noise is accomplished in a short period, for example of the order of 10 to 15 seconds duration, immediately preceding operation of the enabler 34, whereby at the time of operation of the enabler the gate relay circuit sensitivity will be adjusted accurately in accordance with the self-noise extant immediately prior to this time.

The resistance 44 may have either a linear or a logarithmic variation characteristic. Whatever its characteristic, its parameters should be such, of course, in relation to the parameters of the amplifier 25, as to enable reduction of the amplifier gain over the range necessary to adjust the gate relay sensitivity to the point where false operation of the transfer relay 20 by self-noise is prevented.

Although the invention has been described in connection with a control circuit for a rudder effective to steer the torpedo horizontally, it will be understood, of course, that it may be utilized in elevator control circuits, i.e. circuits for steering a torpedo vertically, for example to adjust the sensitivity of the gate relay which determines the point in the torpedo's course at which control of the elevator is transferred from one type of control, for example by a depth-pendulum unit such as described in the application of John C. Steinberg identified hereinabove, to target signal control. Further, it will be understood that the specific embodiment of the invention shown and described is but illustrative and that various modifications may be made therein without departing from the scope and spirit of this invention as defined in the appended claims.

What is claimed is:

1. A steering system for a moving body, comprising a steering member, a first means for controlling said member to steer the body along a preset course, a second means actuated in accordance with signals in the vicinity of the body for controlling said member to steer the body in the effective direction, with respect to the body, of the source of said signals, said first means being normally associated with and said second means being normally dissociated from said member, transfer means for associating said second means with said member and dissociating said first means therefrom, gate means controlled in accordance with the level of said signals for effecting operation of said transfer means only when said level is of at least a certain magnitude, and means for adjusting the sensitivity of said gate means in accordance with self-noise signals of the body to a value such that said certain magnitude is above the level of said self-noise signals.

2. A steering system for a moving body, comprising a steering member, a first means for controlling said member to steer the body along a preset course, a second means actuated in accordance with signals in the vicinity of the body for controlling said member to steer the body in the effective direction, with respect to the body, of the source of said signals, said first means being normally associated with and said second means being normally dissociated from said member, transfer means for associating said second means with said member and dissociating said first means therefrom, said second means including signal translating means responsive to said signals and an amplifier energized in accordance with the output of said signal translating means, gate means controlled in accordance with the output of said amplifier and responsive only when the amplifier output is of at least a preassigned amplitude for effecting operation of said transfer means, and means for adjusting the output level of said amplifier in accordance with self-noise signals of said body to reduce the amplifier output for said self-noise signals below the value requisite for operation of said gate means.

3. A steering system for a moving body, comprising a steering member, a first means for controlling said member to steer the body along a preset course, a second means actuated in accordance with signals in the vicinity of the body for controlling said member to steer the body in the effective direction, with respect to the body, of the source of said signals, said first means being normally associated with and said second means being normally dissociated from said member, transfer means for associating said second means with said member and dissociating said first means therefrom, said second means including signal translating means responsive to said signals and an amplifier energized in accordance with the output of said signal translating means, gate means controlled in accordance with the output of said amplifier and responsive only when the amplifier output is of at least a preassigned amplitude for effecting operating of said transfer means, a gain adjustment element for said amplifier, and means controlled in accordance with self-noise signals of said body for actuating said element to adjust the amplifier gain to a value such that the amplifier output for said self-noise signals is below that requisite for operation of said gate means.

4. A steering system for a moving body, comprising a steering member, a first means for controlling said member to steer the body along a preset course, a second means actuated in accordance with signals in the vicinity of the body for controlling said member to steer the body in the effective direction, with respect to the body, of the source of said signals, said first means being normally associated with and said second means being normally dissociated from said member, transfer means for associating said second means with said member and dissociating said first means therefrom, said second means including signal translating means responsive to said signals and an amplifier energized in accordance with the output of said signal translating means, gate means controlled in accordance with the output of said amplifier and responsive only when the amplifier output is of at least a preassigned amplitude for effecting operation of said transfer means, an impedance associated with said amplifier for determining the gain thereof, and means controlled by said gate means for adjusting said impedance to reduce the gain of said amplifier to a value such that the amplifier output for self-noise signals of said body is below that requisite for operation of said gate means.

5. A steering system for a moving body, comprising a steering member, a first means for controlling said member to steer the body along a preset course, a second means actuated in accordance with signals in the vicinity of the body for controlling said member to steer the body in the effective direction, with respect to the body, of the source of said signals, said first means being normally associated with and said second means being normally dissociated from said member, transfer means for associating said second means with said member and dissociating said first means therefrom, said second means including signal translating means responsive to said signals and an amplifier energized in accordance with the output of said signal translating means, gate means controlled in accordance with the output of said amplifier and responsive only when the amplifier output is of at least a preassigned amplitude for effecting operation of said transfer means, a gain reducing element for said amplifier, actuating means for said element, an energizing circuit for said actuating means controlled by said gate means and arranged to be closed only when said gate means operates, and means for enabling said circuit for only a prescribed period subsequent to initiation of motion of said body.

6. A steering system for a moving body, comprising a steering member, a first means for controlling said member to steer the body along a preset course, a second means actuated in accordance with signals in the vicinity of the body for controlling said member to steer the body in the effective direction, with respect to the body, of the source of said signals, said first means being normally associated with and said second means being normally dissociated from said member, transfer means for associating said second means with said member and dissociating said first means therefrom, said second means including signal translating means responsive to said signals and an amplifier energized in accordance with the output of said signal translating means, an energizing circuit for said transfer means including means for enabling said circuit at a preassigned time subsequent to initiation of motion of the body and including also gate means for completing said circuit, said gate means being controlled in accordance with the output of said amplifier and responsive only when said amplifier output is of at least a preassigned amplitude, and means for decreasing the output level of said amplifier proportionately to the level of self-noise of said body during a period preceding operation of said enabling means.

7. A steering system for a moving body, comprising a steering member, a first means for controlling said member to steer the body along a preset course, a second means actuated in accordance with signals in the vicinity of the body for controlling said member to steer the body in the effective direction, with respect to the body, of the source of said signals, said first means being normally associated with and said second means being normally dissociated from said member, transfer means for associating said second means with said member and dissociating said first means therefrom, an energizing circuit for said transfer means, means for enabling said circuit at a preassigned time after initiation of motion of the body, means for closing said circuit only when the level of said signals is of a certain value above the level of self-noise signals of the body, and means for adjusting said circuit closing means proportionately to said self-noise signals during a period immediately preceding operation of said enabling means, so that said certain value is slightly above said level of self-noise signals.

8. A steering system for a torpedo, comprising a rudder, gyroscope means for controlling said rudder to maintain the torpedo upon a preset course, signal responsive means for controlling said rudder in accordance with submarine signals in the vicinity of the torpedo to steer the torpedo toward the source of such signals, said signal responsive means including hydrophone means and an amplifier energized in accordance with the output of said hydrophone means, said gyroscope means being normally associated with said rudder and said signal responsive means being normally dissociated from said rudder, transfer means for associating said signal responsive means with said rudder and dissociating said gyroscope means therefrom, means for enabling said transfer means at a preassigned time after launching of the torpedo, gate means controlled in accordance with the output of said amplifier for effecting operation of said transfer means only when the output of said amplifier is of at least a certain magnitude, and means for adjusting the gain of said amplifier immediately preceding operation of said enabling means, to a value such that the output of said amplifier for torpedo self-noise is just below said certain magnitude.

9. A steering system in accordance with claim 8 wherein said gain adjusting means comprises a variable impedance associated with said amplifier, actuating means for varying said impedance to decrease the gain of said amplifier, an energizing circuit for said actuating means controlled by said gate means and associated therewith to be closed only when said gate means is operated and means for enabling said circuit for a period of preassigned duration immediately preceding operation of said transfer enabling means.

10. A control circuit comprising an operating element, signal responsive means for controlling said element in accordance with signals emanating from a distant source including a signal translating device and an amplifier energized in accordance with the output of said device, said signal responsive means being normally dissociated from said element, means controlled in accordance with the output of said amplifier for associating said signal responsive means with said element only when said amplifier output is of at least a preassigned amplitude, and means for adjusting said amplifier in accordance with noise signals emanating from a source in proximity to said device to reduce the output of said amplifier for such noise signals below said preassigned amplitude.

11. In combination, an amplifier, a signal translating device constituting the input element for said amplifier, means for adjustably reducing the gain of said amplifier, actuating means for said gain reducing means, an energizing circuit for said actuating means, means for enabling said circuit for a prescribed period subsequent to a reference time, a relay effective when operated to close said circuit, and means controlled in accordance with the output of said amplifier for operating said relay only when said amplifier output is of at least a preassigned magnitude.

No references cited.